(12) United States Patent
Müller et al.

(10) Patent No.: US 12,085,134 B2
(45) Date of Patent: Sep. 10, 2024

(54) BRAKE DISC

(71) Applicant: Erdrich Umformtechnik GmbH, Renchen-Ulm (DE)

(72) Inventors: Matthias Müller, Oberkirch (DE); Ulrich Lorenz, Sömmerda (DE); Rico Bauersfeld, Kannawurf (DE)

(73) Assignee: Erdrich Umformtechnik GmbH, Renchen-Ulm (DE)

( * ) Notice: Subject to any disclaimer, the term of this patent is extended or adjusted under 35 U.S.C. 154(b) by 334 days.

(21) Appl. No.: 17/612,607

(22) PCT Filed: May 20, 2020

(86) PCT No.: PCT/EP2020/064173
§ 371 (c)(1),
(2) Date: Nov. 19, 2021

(87) PCT Pub. No.: WO2020/234406
PCT Pub. Date: Nov. 26, 2020

(65) Prior Publication Data
US 2022/0196091 A1 Jun. 23, 2022

(30) Foreign Application Priority Data
May 21, 2019 (DE) .......................... 102019113487.0

(51) Int. Cl.
*F16D 65/12* (2006.01)
*F16D 65/02* (2006.01)

(52) U.S. Cl.
CPC .... *F16D 65/123* (2013.01); *F16D 2065/1316* (2013.01); *F16D 2065/1328* (2013.01); *F16D 2065/1392* (2013.01)

(58) Field of Classification Search
CPC .......... F16D 65/12; F16D 65/123–128; F16D 2065/1316; F16D 2065/1328;
(Continued)

(56) References Cited
U.S. PATENT DOCUMENTS 6,035,978 A 3/2000 Metzen et al.
8,511,442 B2 * 8/2013 Mueller ................ F16D 65/123
188/218 XL
(Continued)

FOREIGN PATENT DOCUMENTS

CA 2427940 A1 5/2001
CN 105408653 A 3/2016
(Continued)

OTHER PUBLICATIONS

German Office Action dated Oct. 26, 2020 for German Patent Application No. 10 2019 113 487.0.
(Continued)

*Primary Examiner* — Christopher P Schwartz
(74) *Attorney, Agent, or Firm* — Volpe Koenig

(57) ABSTRACT

A brake disc (1) including at least one friction ring (2) and a brake hub (3) connected to the friction ring (2) for conjoint rotation. A side wall section (17) of the brake hub (3) has a plurality of radially oriented deformations (5). A contact surface (7) extending in the radial direction is formed by these deformations (5), and a rotationally fixed connection (8) is established by the contact surface (7) between the friction ring (2) and the brake hub (3). A ratio Da/Di formed from the outer diameter Da of a side wall section (17) of the brake hub (3) and an inner diameter Di of the friction ring (2) is at most 1.01.

18 Claims, 12 Drawing Sheets

(58) Field of Classification Search
CPC ....... F16D 2065/1356; F16D 2065/136; F16D 2065/1392
USPC .......................... 188/218 A, 218 R, 218 XL
See application file for complete search history.

(56) References Cited

U.S. PATENT DOCUMENTS 9,651,104 B2 *  5/2017  Drewes ............... F16D 65/0043
2013/0048448 A1  2/2013  Hanna et al.

FOREIGN PATENT DOCUMENTS

| DE | 4419757 A1 | 12/1995 |
|---|---|---|
| DE | 19931140 A1 | 2/2000 |
| DE | 29924178 U1 | 4/2002 |
| DE | 10103639 A1 | 8/2002 |
| DE | 10250231 | 10/2003 |
| DE | 10261956 A1 | 2/2004 |
| DE | 10322454 | 2/2004 |
| DE | 102008021625 | 11/2008 |
| DE | 102010020913 A1 | 11/2011 |
| DE | 102010055973 B3 | 4/2012 |
| DE | 102012010728 B3 | 11/2013 |
| DE | 102016115022 A1 | 2/2017 |
| EP | 2402625 B1 | 10/2012 |
| KR | 101499125 B1 | 3/2015 |
| WO | 2015058314 | 4/2015 |

OTHER PUBLICATIONS

German Office Action dated Jan. 23, 2020 for German Patent Application No. 10 2019 113 487.0.

* cited by examiner

BRAKE DISC

TECHNICAL FIELD

The invention relates to a brake disc which comprises at least one friction ring and a brake hub which is connected to the friction ring in a rotationally secure manner.

BACKGROUND

Brake discs of the type mentioned in the introduction are previously known, for example, from the publications U.S. Pat. No. 6,035,978 A, DE 10 2008 021 625 A1, DE 102 50 231 A1 and DE 103 22 454 A1 and are, for example, installed in disc brakes of motor vehicles in order during a braking operation using brake liners which are secured to a brake caliper to slow down a rotational movement. As a result of the production of friction between the brake disc and the brake liner, a kinetic energy of a vehicle can be converted into a thermal energy, whereby the vehicle loses speed.

Brake discs which are produced primarily to achieve a weight reduction of the entire brake disc in at least two pieces from a friction ring and a brake hub are already known. The term "friction ring" is used to refer to the portion of a brake disc which comes into contact with the brake liners.

One problem with brake discs which are configured in several pieces is that the friction ring has to be connected to the brake hub in such a stable manner that the connection is maintained, even in the event of the high loads of a braking process.

SUMMARY

The solution to this problem is achieved according to the invention by one or more of the features disclosed herein.

In particular, in order to achieve the objective, a brake disc of the type mentioned in the introduction is provided, wherein a side wall of the brake hub has at least one deformation in a radial direction, via which deformation there is formed an abutment face which is orientated in the circumferential direction of the brake hub, and by means of which abutment face a rotationally secure connection between the friction ring and the brake hub is configured, and in that a ratio Da/Di which is formed from an outer diameter Da of a side wall portion of the brake hub and an inner diameter Di of the friction ring is a maximum of 1.01. The advantage of the configuration according to the invention is that, as a result of the at least one deformation, a particularly stable, rotationally secure connection is formed between the friction ring and the brake hub. Furthermore, the outer diameter Da of the brake hub is a maximum of 101% of the inner diameter of the friction ring since with an excessive overdimension of the side wall portion of the brake hub the production is difficult. For example, when the brake hub is inserted into the friction ring, damage, such as the formation of cracks, may occur. Furthermore, as a result of the limitation of the overdimension of the brake hub, a deformation (shielding) of the entire brake disc can better be prevented, which deformation occurs in the case of relatively long braking operations, particularly when the friction ring becomes significantly heated. The friction ring may in this instance, for example, be produced as a casting, in particular from a grey cast iron, whereby the required material properties can be achieved. The brake hub itself may be produced by means of material deformation. As a result of the two-part configuration, it is possible to construct the walls of the brake hub to be significantly more thin-walled than in single-piece brake discs and consequently to save weight. The production of a rotationally secure connection by means of at least one deformation, preferably by means of several deformations, is additionally simple to produce, requires no particular provisions in terms of precision during production and, depending on the requirements of the brake torque, can be scaled by means of the number of deformations used to form the rotationally secure connection. As a result of the at least one deformation, in particular a positive-locking connection can be formed between the friction ring and the brake hub. As a result of the two-part configuration, an uncoupling of the friction ring and the brake hub is possible so that the friction face of the brake disc has a tendency to form fewer cracks.

The abutment face which is orientated in the circumferential direction of the brake hub may be at least partially orientated in such a manner that a normal vector located on the abutment face faces in the circumferential direction of the brake hub. Consequently, a particularly good brake torque transmission is possible. In particular, this may be understood to mean that the abutment face extends at least partially in a radial direction.

A deformation in the context of the application may relate to a structure which is selectively produced by means of a shaping technique, wherein the structure produced may protrude in a radial direction from the wall of the brake hub.

The term "rotationally secure" in the context of the application may mean that no relative rotation of the friction ring relative to the brake hub, in particular about a rotation axis, is possible, in particular without destroying the brake disc.

Advantageous embodiments of the invention which alone or in combination with the features of other embodiments can optionally be combined together.

According to an advantageous embodiment, the friction ring may have at least one securing hole. For example, the at least one securing hole may be configured as a blind hole and/or as a ventilation channel. Preferably wherein the at least one deformation and/or one securing element which is inserted into the at least one deformation and/or which is retained by the at least one deformation at least partially engages in the at least one securing hole so that a rotationally secure connection between the friction ring and brake hub is configured. Consequently, a particularly stable rotationally secure connection is formed between the friction ring and the brake hub.

According to another advantageous embodiment, the friction ring may have at least one ventilation channel which extends at least partially in a radial direction and which extends from an inlet opening formed in the inner circumferential face as far as an outer circumferential face of the friction ring. Consequently, it is possible to discharge the thermal energy produced during a braking operation via the at least one ventilation channel so that excessive heating of the brake disc can be prevented. Brake discs having ventilation channels are already known per se and may, for example, be formed by the connection of two friction discs, between which the ventilation channels extend. In order in addition to the ventilation channels not to have to form any additional securing holes, the at least one ventilation channel may be provided to configure a rotationally secure connection between the friction ring and brake hub. The at least one deformation may therefore be formed on or in the region of the inlet opening of the ventilation channel.

In order to form a particularly stable rotationally secure connection between the friction ring and the brake hub, the deformation may be directed outward and/or inward. Preferably, therefore, the deformation can extend perpendicularly to a rotation direction which is produced during a braking operation and/or can be orientated at least partially in the rotation direction. Consequently, adequate strength is configured, even in the event of a relatively high brake torque.

According to another advantageous embodiment, at least one securing element may be inserted into the at least one deformation. Alternatively or additionally, at least one securing element may be retained by the deformation. The abutment face may in this instance be formed at least partially by the securing element. As a result of the at least one securing element, a positive-locking connection may be configured between the friction ring and the brake hub. Preferably, a remaining stamp which is used to produce the deformation may be configured as a securing element. By using a securing element, a higher brake torque can be achieved. The brake disc may consequently be suitable for being able to produce sufficiently large braking force, even in heavy vehicles, such as trucks, in order to brake them.

According to an advantageous embodiment, the abutment face may be formed at least partially by the deformation itself or not by the deformation itself. The deformation can consequently be used directly or indirectly in order to form the rotationally secure connection between the friction ring and the brake hub. The term "indirectly" in this context may mean that the deformation is used only to retain the securing element, but that the actual abutment face is formed by the securing element.

According to another advantageous embodiment, there may be provision for a ratio Da/Di which is formed by the outer diameter Da of a side wall portion of the brake hub and an inner diameter Di of the friction ring to be a minimum of 0.99. Alternatively or additionally, there may be provision in this instance for a gap, in particular an air gap, to be formed between the side wall portion of the brake hub and a or the inner circumferential face of the friction ring. As a result of such an undersized production, it is more readily possible to prevent the effect of shielding in which a heating produced by friction deforms the brake disc in shield form out of its plane and under some circumstances leads to damage to the brake disc.

The side wall portion of the brake hub may, for example, have an outer diameter of from 160 mm to 170 mm.

It may be particularly advantageous if, by means of the at least one deformation, in particular directly and/or indirectly, a positive-locking connection is produced between the friction ring and the brake hub.

According to another advantageous embodiment, an inner diameter of the friction ring may be determined by an inner delimitation of a friction face, on which a braking operation is carried out.

According to an advantageous development, there may be provision for the at least one deformation to be formed by means of punching and/or bending and/or a stamping of the wall of the brake hub. In particular, the deformation may be formed when the brake hub is arranged in the friction ring. The rotationally secure connection can consequently be configured by introducing a wall, in particular an upstream wall, of the brake hub into the friction ring. Consequently, the configuration of a particularly stable, rotationally secure connection which can nonetheless be produced in a favorable manner is possible.

In order to allow a better heat discharge of the brake disc which is heated during a braking operation, the brake hub may have at least one through-opening. Preferably, the at least one through-opening may be associated with an inlet opening of a ventilation channel of the friction ring, The through-opening can consequently abut an inlet opening of a ventilation channel or be adjacent thereto in order to be able to produce a particularly good internal ventilation of the brake disc.

According to a particularly advantageous embodiment, an edge region of at least one through-opening, for example, the above-mentioned at least one through-opening, may be formed as the at least one deformation. Preferably, the deformation may extend completely around the through-opening. The at least one deformation may, for example, be constructed as a preferably circumferential neck. Consequently, a rotationally secure connection which is configured by means of a positive-locking connection is possible between the abutment face which is formed in particular by the deformation and/or a securing element, and a wall, in particular an inner wall, of the at least one securing hole.

In order to be able to increase a maximum brake torque of the brake disc, it may be advantageous for the brake disc to have a plurality of deformations. Preferably, the deformation may be arranged in a state distributed in a uniform manner and/or in a point-symmetrical manner in a plane. Alternatively, they may be distributed in a non-uniform manner in a plane.

In order to be able to form a particularly stable brake disc which withstands a high brake torque, at least two deformations may be formed in different planes.

According to an advantageous embodiment, a number of deformations may be odd or even.

According to another advantageous embodiment, the at least one deformation and/or the at least one through-opening of the brake hub may be arranged so as to correspond to and/or deviate from a position of one or the at least one inlet opening of a or the ventilation channel on the friction ring. Consequently, the effect of the shielding can be further reduced in order to counteract a thermal distortion and to reduce the axial deflection.

According to another advantageous embodiment, there may be provision for the brake hub to have at least one through-opening having at least one deformation and at least one through-opening without any deformation. Consequently, it is possible for some through-openings to perform no function in the formation of the rotationally secure connection. They may be provided, for example, only for the discharge of waste heat.

According to a particularly advantageous embodiment, there may be provision for a geometry of at least one securing hole, for example, the at least one securing hole, to be retained in the casting during production by means of a casting method, in particular without additional reprocessing steps, such as cutting. Consequently, the most simple and cost-effective production of the friction ring is possible.

In order to produce a particularly stable, positive-locking connection between the friction ring and the brake hub, the at least one deformation may have a uniform, in particular symmetrical, preferably rotationally symmetrical shape. In the event of a load, consequently, a uniform stress path can be achieved.

In order to achieve a greater percentage contact area of the at least one deformation of the brake disc, at least one securing hole, for example, the at least one securing hole already mentioned above, may have a stop, preferably a stop which is constructed as a step. The stop can thus be acted on by the at least one deformation and/or by a securing element, for example, the at least one securing element.

In order to be able to further improve an inner ventilation of the friction ring, at least one securing element, for example, the at least one securing element already mentioned above, may be configured as a hollow pin.

According to an advantageous embodiment, there may be provision for the friction ring to be produced from iron and/or aluminum, in particular as a casting by means of a casting method. Consequently, cost-effective production is possible.

Alternatively or additionally, there may be provision for the brake hub to be produced from steel and/or aluminum. Consequently, the production of the brake hub is additionally relatively cost-effective.

According to another advantageous embodiment, a number of deformations and/or a number of securing elements may in each case be smaller than a number of securing holes. Consequently, it is possible, as a result of the use of different brake hubs, to form different brake torques with uniform friction rings. Alternatively, the brake hub may remain the same and may be combined with different friction rings.

In order to be able to achieve a uniform load distribution during a braking operation, a regular angular spacing may be configured between the deformations and/or the through-openings and/or the securing holes.

BRIEF DESCRIPTION OF THE DRAWINGS

The invention will now be described in greater detail with reference to a number of embodiments, but is not limited to these embodiments. Other embodiments will be appreciated by the combination of the features of individual or several claims and/or with individual or several features of the embodiments.

In the drawings.

DETAILED DESCRIPTION

Figure 1:
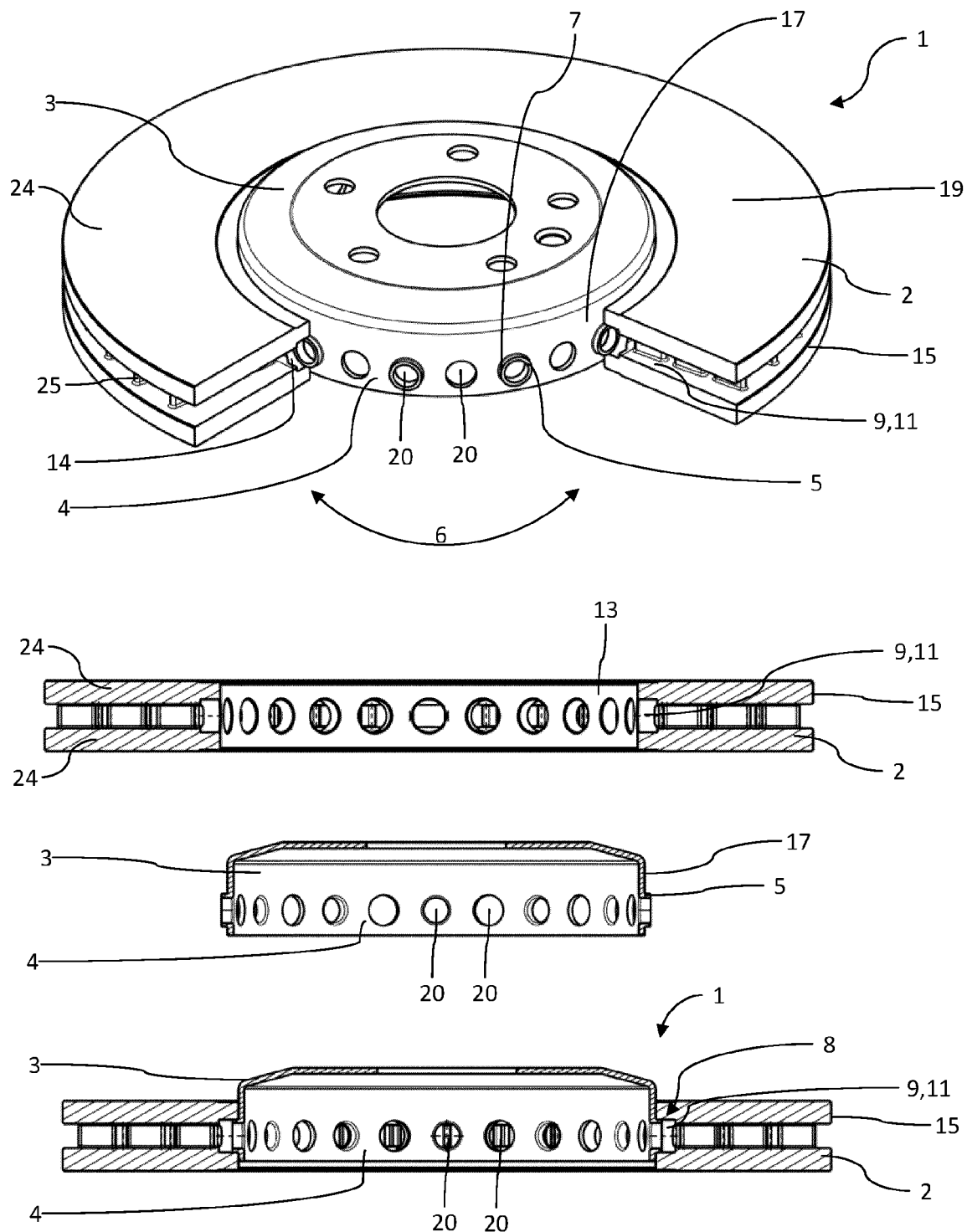
FIG. 1 is a perspective illustration of a first construction variant of a brake disc according to the invention as several sectioned illustrations, wherein all the through-openings and securing holes are located in the same plane, and wherein the ventilation channels in the friction ring act as securing holes.
Figure 2:
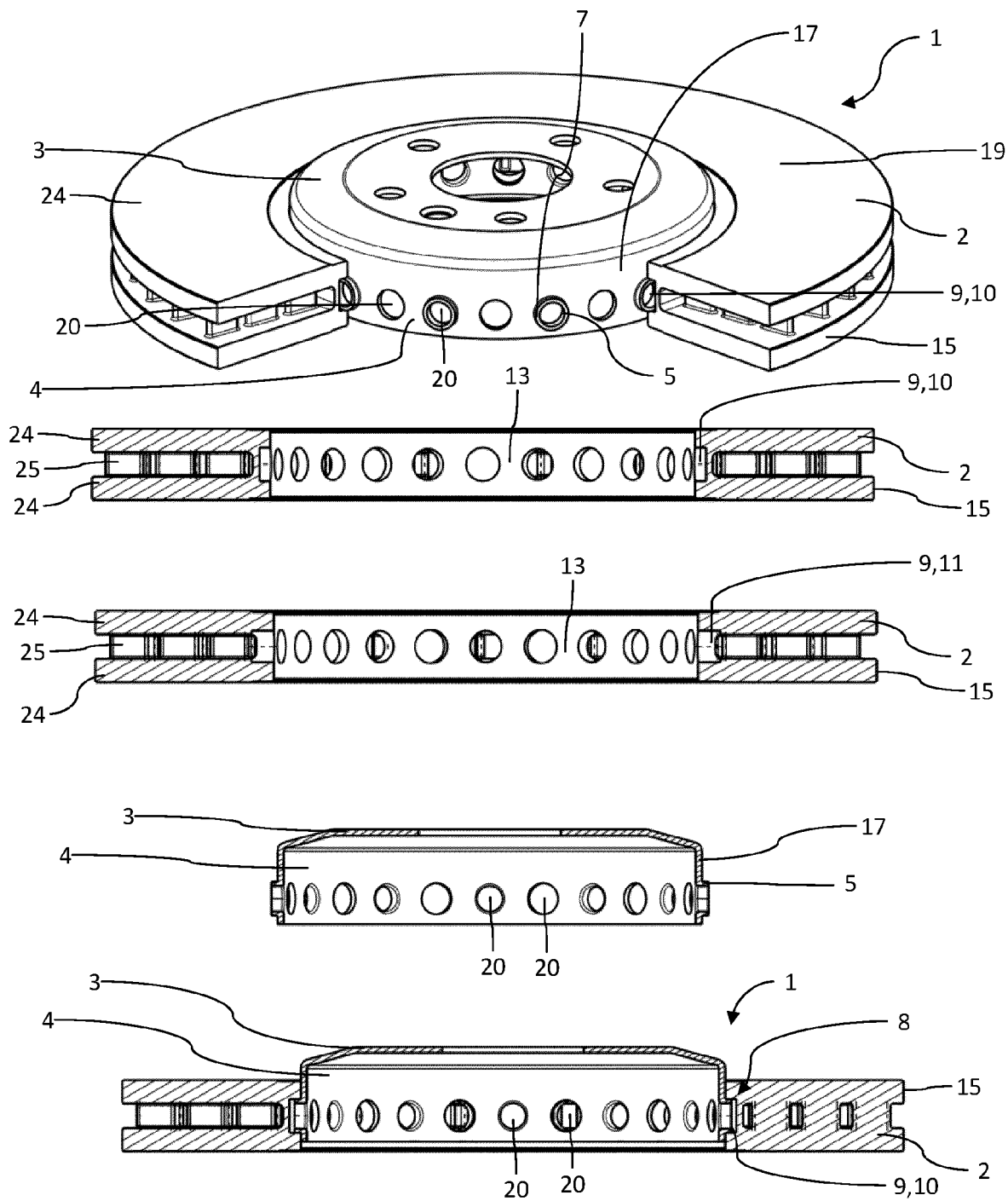
FIG. 2 is a perspective illustration of a second construction variant of a brake disc according to the invention as several sectioned illustrations, wherein all the through-openings and securing holes are located in the same plane, and wherein ventilation channels and/or blind holes in the friction ring act as securing holes.

FIGS. 1 to 6 and 9 to 12 show different construction variants of a brake disc according to the invention which are generally designated 1.

The embodiments of the brake discs 1 shown are particularly suitable for use in motor vehicles.

Each of the embodiments of a brake disc 1 shown has a friction ring 2 and a brake hub 3 which is connected to the friction ring 2 in a rotationally secure manner. The rotationally secure connection may, for example, be formed by means of a positive-locking connection between the friction ring 2 and the brake hub 3.

A side wall 4 of the brake hub 3 has at least one deformation 5 which protrudes in a radial direction from the side wall 4. The illustrated construction variants of the brake disc 1 each have a plurality of deformations 5.

Via the deformations 5, a plurality of abutment faces 7, by means of which a rotationally secure connection 8 between the friction ring 2 and the brake hub 3 is produced in an assembly position, are formed directly or indirectly.

A ratio (Da/Di) which is formed from the outer diameter (Da) of a side wall portion 17 of the brake hub 3 and an inner diameter Di of the friction ring 2 is a maximum of 1.01. As a result of the overdimensioning of the brake hub 3, an even better fixing of the brake hub 3 in the friction ring 2 is possible. A larger overdimensioning would in contrast be unfavorable since this may lead to a deformation of the brake hub 3 potentially occurring.

The friction ring 2 has at least one securing hole 9. A securing hole 9 in the context of the application may be understood to be all hole structures which are in principle suitable for forming a rotationally secure connection between the friction ring 2 and the brake hub 3. In particular, the term "securing hole 9" may refer to a blind hole 10 and/or a ventilation channel 11 of the friction ring 2. The embodiments shown accordingly have a plurality of securing holes 9.

Internally ventilated friction rings 2, in which there is formed at least one ventilation channel 11 which extends in a radial direction and which extends, for example, from an inlet opening 14 formed in the circumferential face 13 as far as an outer circumferential face 15 of the friction ring 2 are already known. The friction rings 2 shown in the Figures are also internally ventilated friction rings 2 which in each case have a plurality of ventilation channels 11 which may be constructed in a continuous and/or non-continuous manner.

As illustrated in FIGS. 1, 2, 3, 4, 5, 6, 8, 9, 11 and 12, the deformations 5 may be directed radially outward and may in each case protrude into a securing hole 9. In this instance, the deformations 5 may abut at least partially against an inner wall of the securing hole 9 so that a positive-locking connection is produced between the friction ring 2 and brake hub 3. Abutment faces 7 are in this instance considered to be the faces of the deformations 5 which are orientated at least in a circumferential direction 6 of the brake hub 3.

Figure 10:
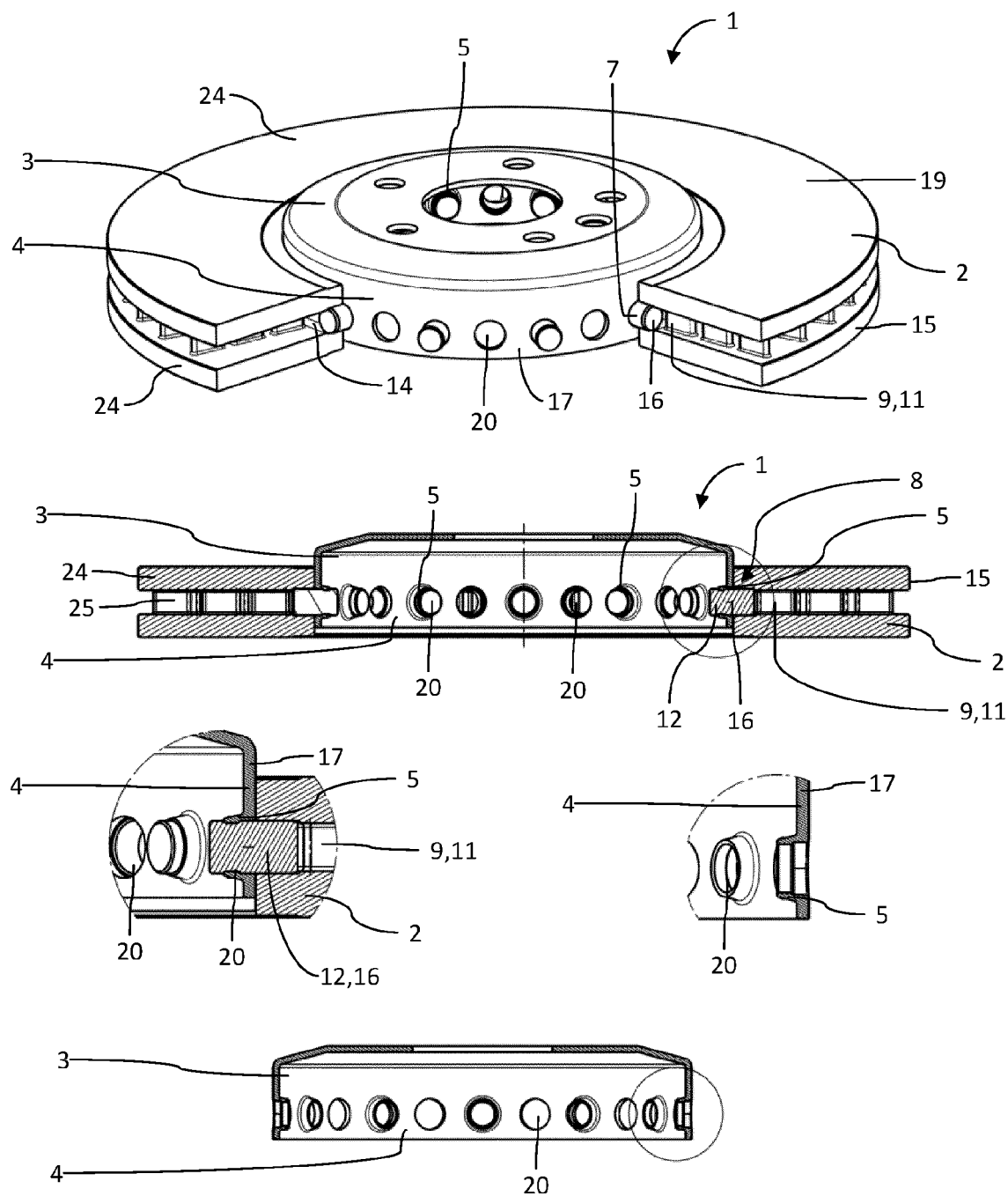
FIG. 10 is a perspective view of an eighth construction variant of a brake disc according to the invention as several sectioned illustrations, wherein all the through-openings and securing holes are located in the same plane, wherein the ventilation channels in the friction ring act as securing holes, and wherein the abutment faces are formed by a plurality of securing elements which are each retained by the deformations.

However, it is also conceivable for the deformations 5 to be directed radially inward, as shown in FIG. 10. In this embodiment in FIG. 10, the abutment face 7 is constructed exclusively by a securing element 12 which is retained by means of a through-opening 20 and/or a deformation 5. The securing element 12 engages in this instance in a securing hole 9 which is associated with the securing element 12 in the friction ring 12. A rotationally secure, in particular positive-locking connection is thereby produced. Abutment faces 7 are in this instance considered to be the faces of the securing elements 12 which are orientated at least in the circumferential direction 6 of the brake hub 3.

The securing element 12 may, for example, be configured as a pin and/or as a remaining stamp 16 which is used to produce a deformation 5.

Figure 9:
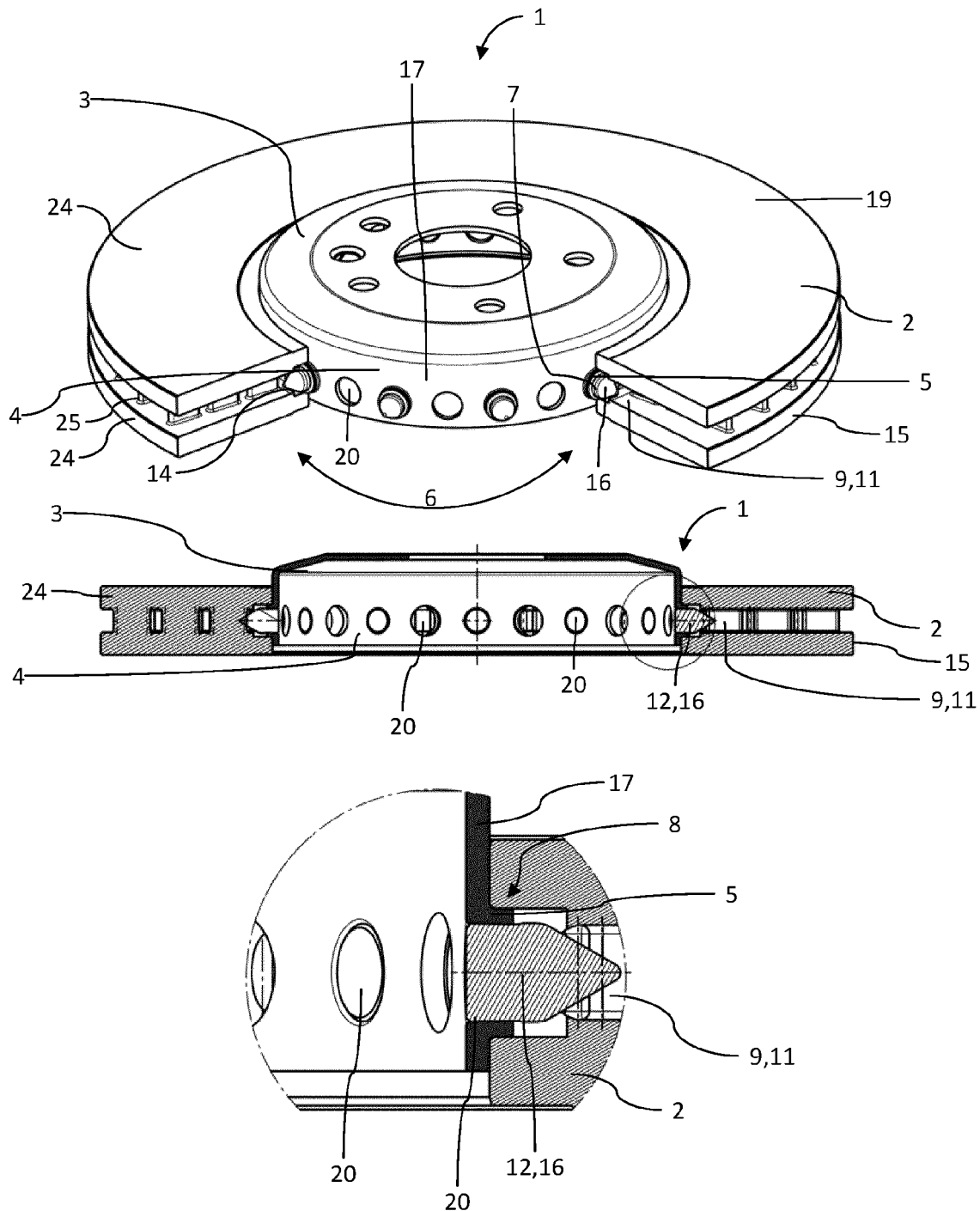
FIG. 9 is a perspective view of a seventh construction variant of a brake disc according to the invention as several sectioned illustrations, wherein all the through-openings and securing holes are located in the same plane, wherein the ventilation channels in the friction ring act as securing holes, and wherein the abutment face(s) is/are formed by means of the deformations and/or a plurality of securing elements.

Another embodiment having a plurality of securing elements 12 is shown in FIG. 9. The securing elements 12 are in this instance driven by the side wall 4 of the brake hub 3 so that the deformations 5 are in each case formed by the introduction of the securing element 12. At the same time, the securing elements 12 protrude in each case into a securing hole 9 in the friction ring. A rotationally secure, positive-locking connection is thereby formed between the friction ring 2 and the brake hub 3.

The securing elements 12 can consequently in each case close a through-opening 20 of the brake hub and/or be retained by the deformations 5.

In the construction variants illustrated in FIGS. 9 and 10, the brake hub 3 has a plurality of through-openings 20, wherein each second through-opening 20 has a securing element 12.

The abutment faces 7 in the construction variant illustrated in FIG. 9 are formed by both the deformations 5 and the securing element 12.

Figure 4:
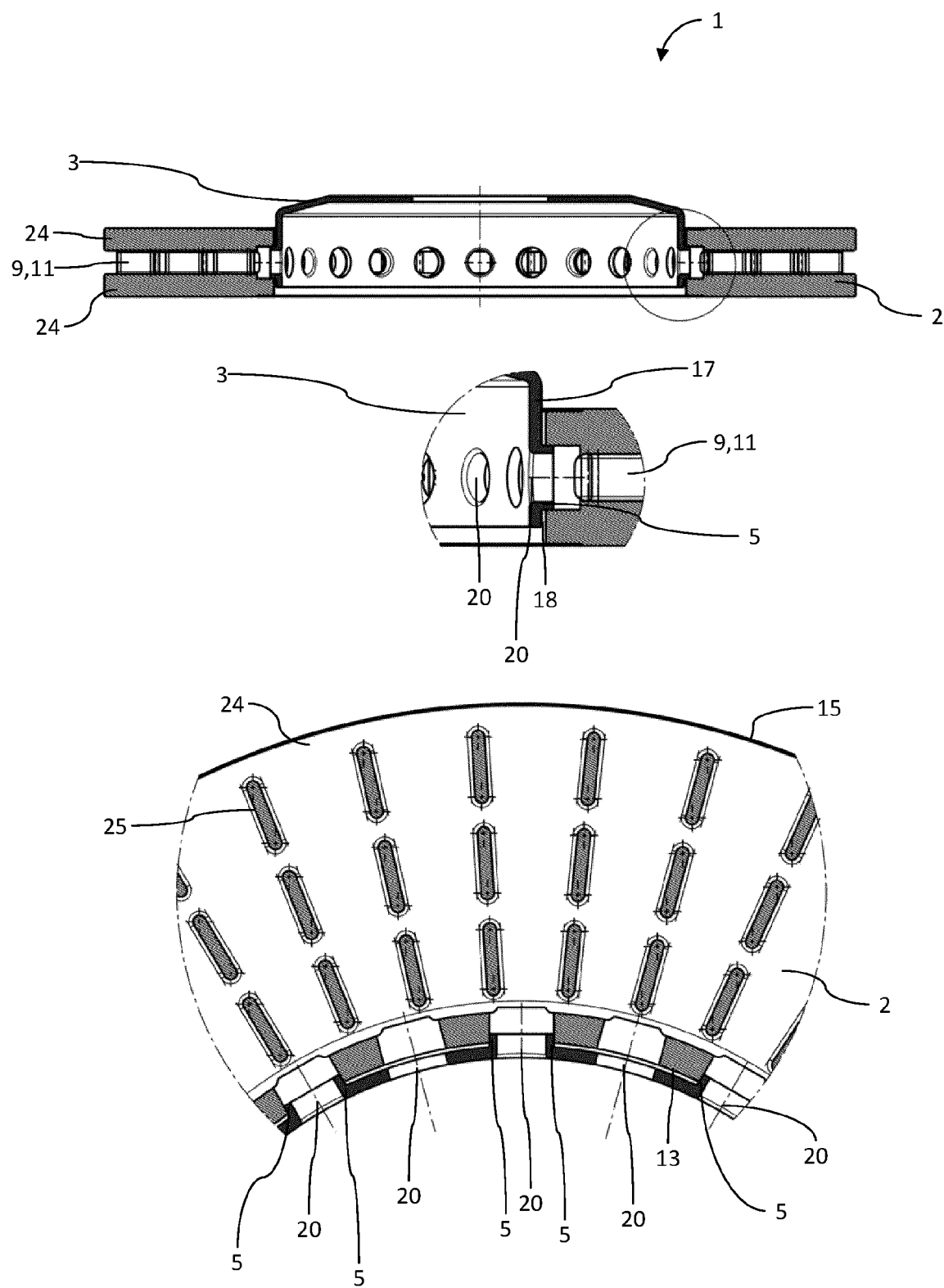
FIG. 4 shows a fourth construction variant of a brake disc according to the invention in several sectioned illustrations, wherein a side wall portion of the brake hub is produced at least partially with underdimensioning with respect to the inner diameter of the friction ring so that a gap is formed between the side wall of the brake hub and an inner circumferential face of the friction ring, wherein all the through-openings and securing holes are located in the same plane, and wherein ventilation channels and/or blind holes in the friction ring act as securing holes.
Figure 5:
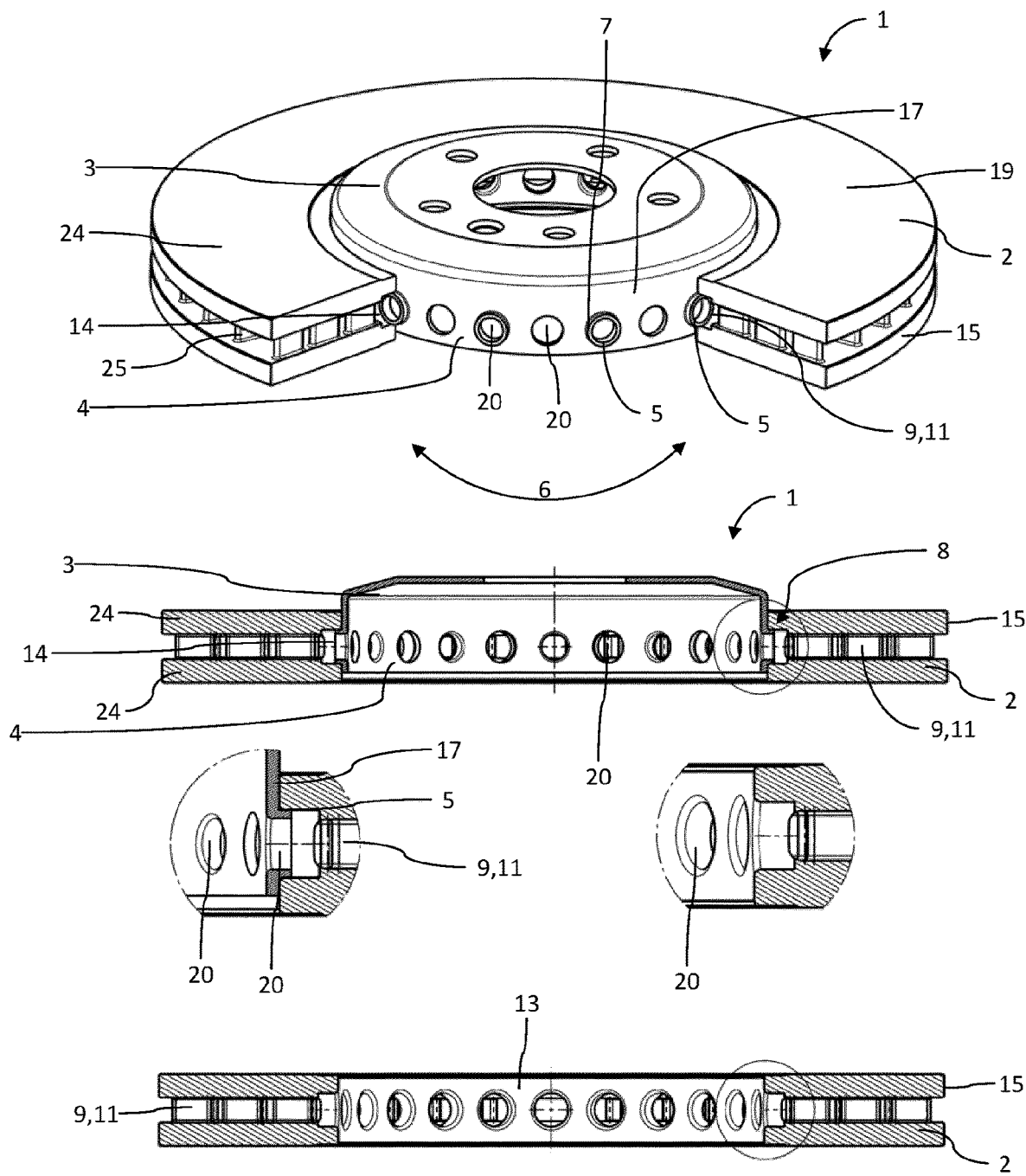
FIG. 5 is a perspective view of a fifth construction variant of a brake disc according to the invention as several sectioned illustrations, wherein all the through-openings and securing holes are located in the same plane, and wherein ventilation channels in the friction ring act as securing holes.
Figure 6:
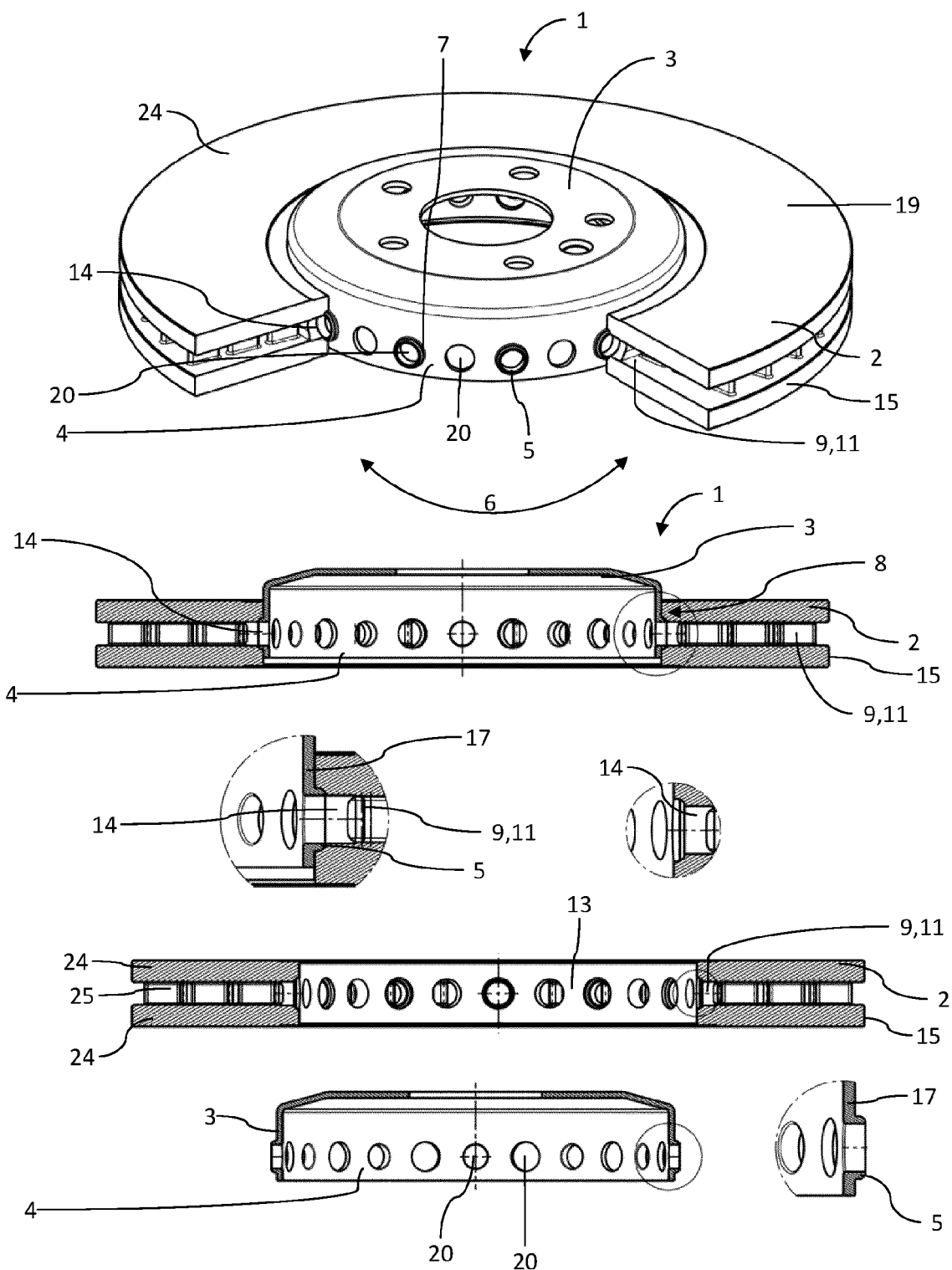
FIG. 6 is a perspective view of a sixth construction variant of a brake disc according to the invention as several sectioned illustrations, wherein all the through-openings and securing holes are located in the same plane, and wherein ventilation channels in the friction ring act as securing holes.

In the construction variant illustrated in FIG. 4, the brake hub 3 is produced with a degree of underdimensioning compared with the friction ring 2. This means that a ratio Da/Di which is formed from the outer diameter Da of the side wall portion 17 of the brake hub 3 and an inner diameter Di of the friction ring 2 is in this instance smaller than 1, in particular a minimum of 0.99.

A gap 18 is consequently formed between the side wall portion 17 of the brake hub 3 and a or the inner circumferential face 13 of the friction ring 2. As a result of this gap 18, a negative effect of the shielding which may occur during a braking operation can be better prevented since a type of buffer zone is formed.

The through-openings 20 may, for example, be formed by punching out and/or by laser-processing the side wall portion 17. Laser-processing may in this instance, for example, involve annealing and/or completely cutting out the through-openings 20 in the side wall portion 17.

Figure 7:
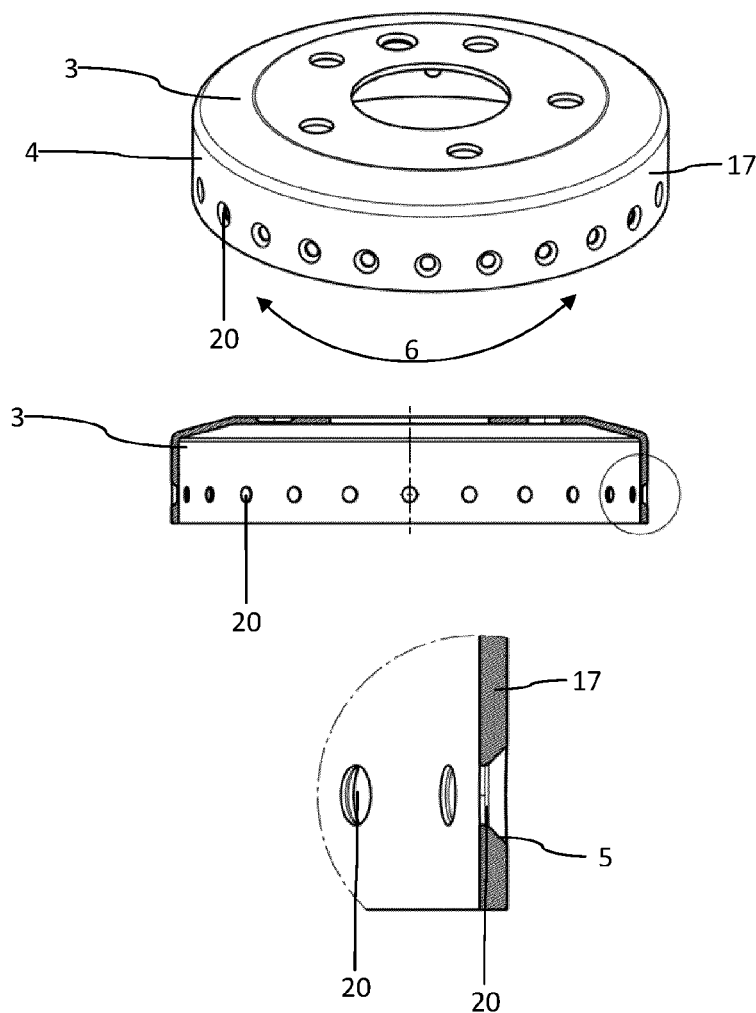
FIG. 7 shows a construction variant of a brake hub, in particular before the deformations are formed, wherein the deformations can be formed, for example, by introducing a stamp into the through-holes.

In the brake hub 3 illustrated in FIG. 7, a brake hub 3 with a plurality of through-openings 20 located in a plane is illustrated. An opening cross-section of the through-openings 20 expands outward. By stamping the through-openings 20 in the brake hub 3, a compression tension on the inner diameter can be maintained and later reduces the formation of cracks (tensile stress after formation of the deformation 5, in particular after forming a necked opening which protrudes into a securing hole 9).

Figure 8:
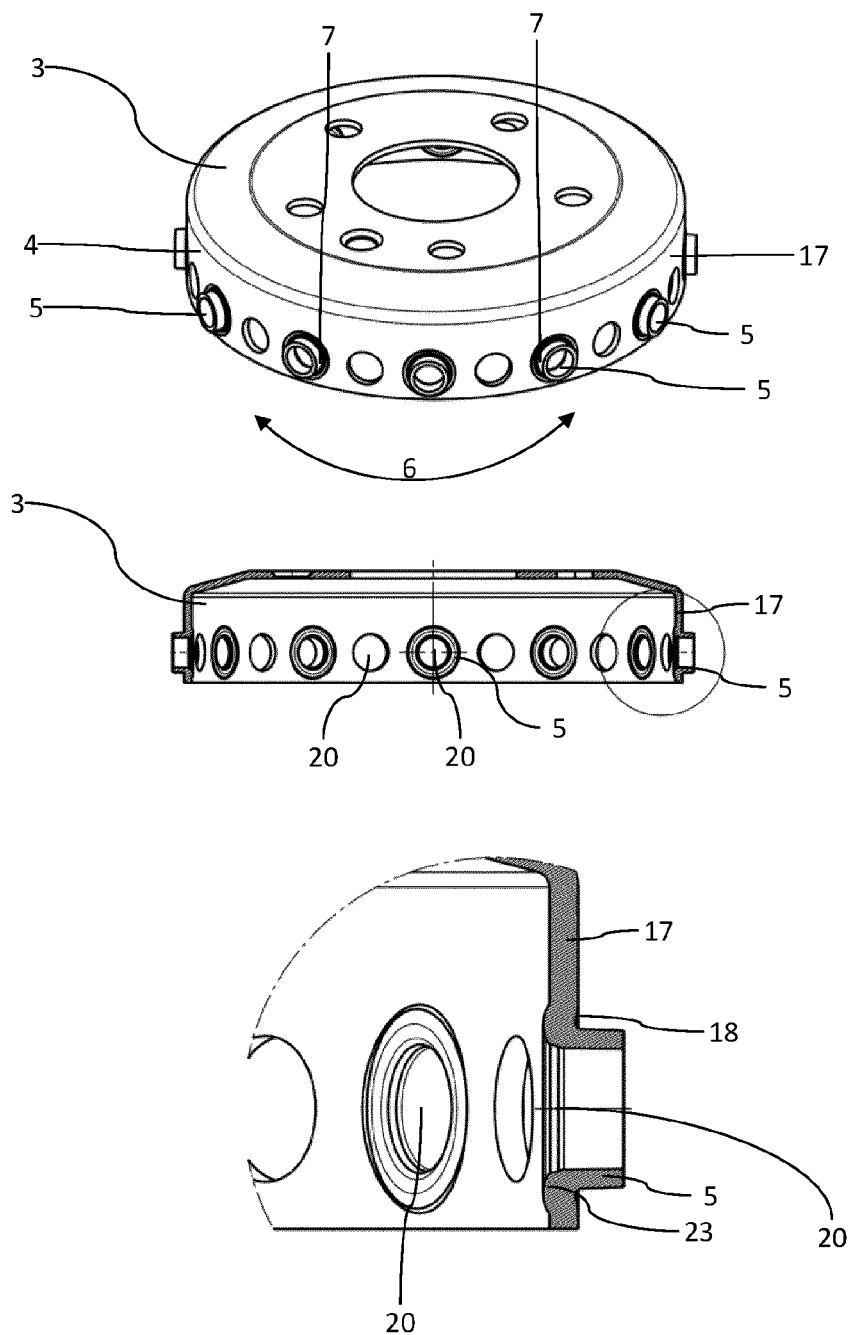
FIG. 8 shows a construction variant of another brake hub after the deformations have been formed, wherein there is formed at a bending location of the side wall an inwardly directed curvature, by which there is formed on the outer circumference of the brake hub a groove, through which in the assembly state a gap is formed at this location between the friction ring and the brake hub.

In the embodiment shown in FIG. 8, in particular as a result of the wall thickness used, at a bending location of the side wall 4 there is formed an inwardly directed curvature 23 by means of which there is formed on the outer circumference of the brake hub 3 a groove, by means of which a gap 18 is formed at this location in the assembly state between the friction ring 2 and the brake hub 3. Load peaks, which act in particular on the bending location, can consequently be better prevented. In particular with a brake hub 3 made of light metal, such as aluminum, in order to form a sufficiently stable brake hub 3, a substantially thicker wall thickness in comparison with brake hubs 3 made of steel has to be used. In this instance, however, a formation of a right-angled edge as a result of the wall thickness during the shaping operation is no longer possible. Therefore, it is consequently advantageous to use stamping methods in order to form a deformation 5 which is configured as a stamping 22 (cf. FIGS. 11 and 12).

The curvature 23 may, for example, be constructed as a concentric shaft, wherein the curvature 23 retains material and subsequently enables the formation of a deformation 5, in particular the formation of a neck/necked opening. As a result of the material retained, longer deformations may also be formed, for example, in a radial direction. In order to assemble the brake disc 1, a prefabricated deformation 5, in particular a neck, may be pressed radially outward, whereby the assembly process is significantly simplified (for example, wherein, in only one step, all necks are pressed outward into the corresponding securing holes 9).

An inner diameter of the friction ring 2 is defined by an inner boundary of a friction face 19, wherein the braking operation is carried out on the friction face 19. Consequently, the most extensive and weight-saving possible configuration of a brake disc 1 is possible.

Figure 11:
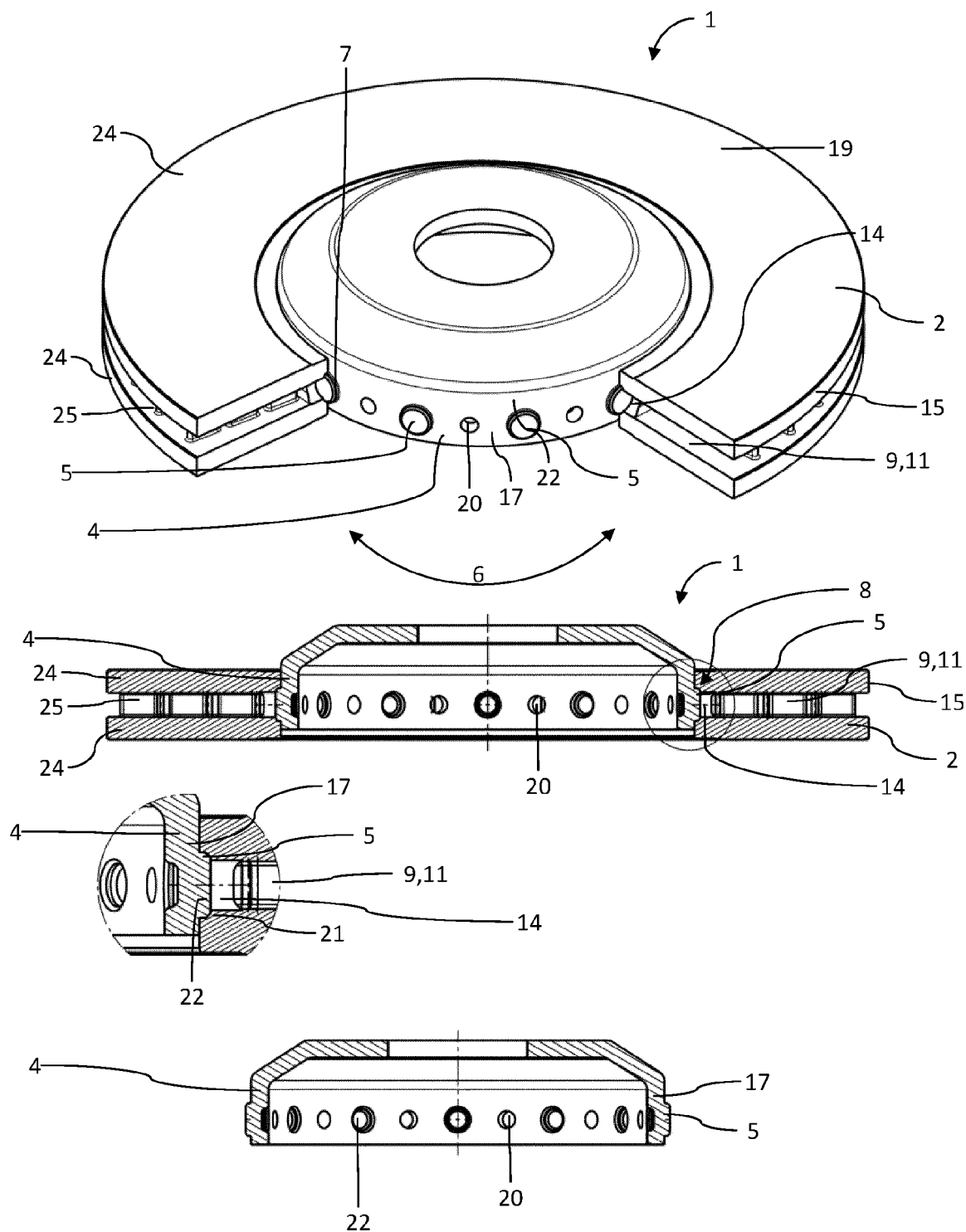
FIG. 11 is a perspective view of a ninth construction variant of a brake disc according to the invention as several sectioned illustrations, wherein all the deformations and securing holes are located in the same plane, wherein the ventilation channels in the friction ring act as securing holes, and wherein the abutment faces are formed by a plurality of deformations which are formed in each case as stampings and which have no through-openings.
Figure 12:
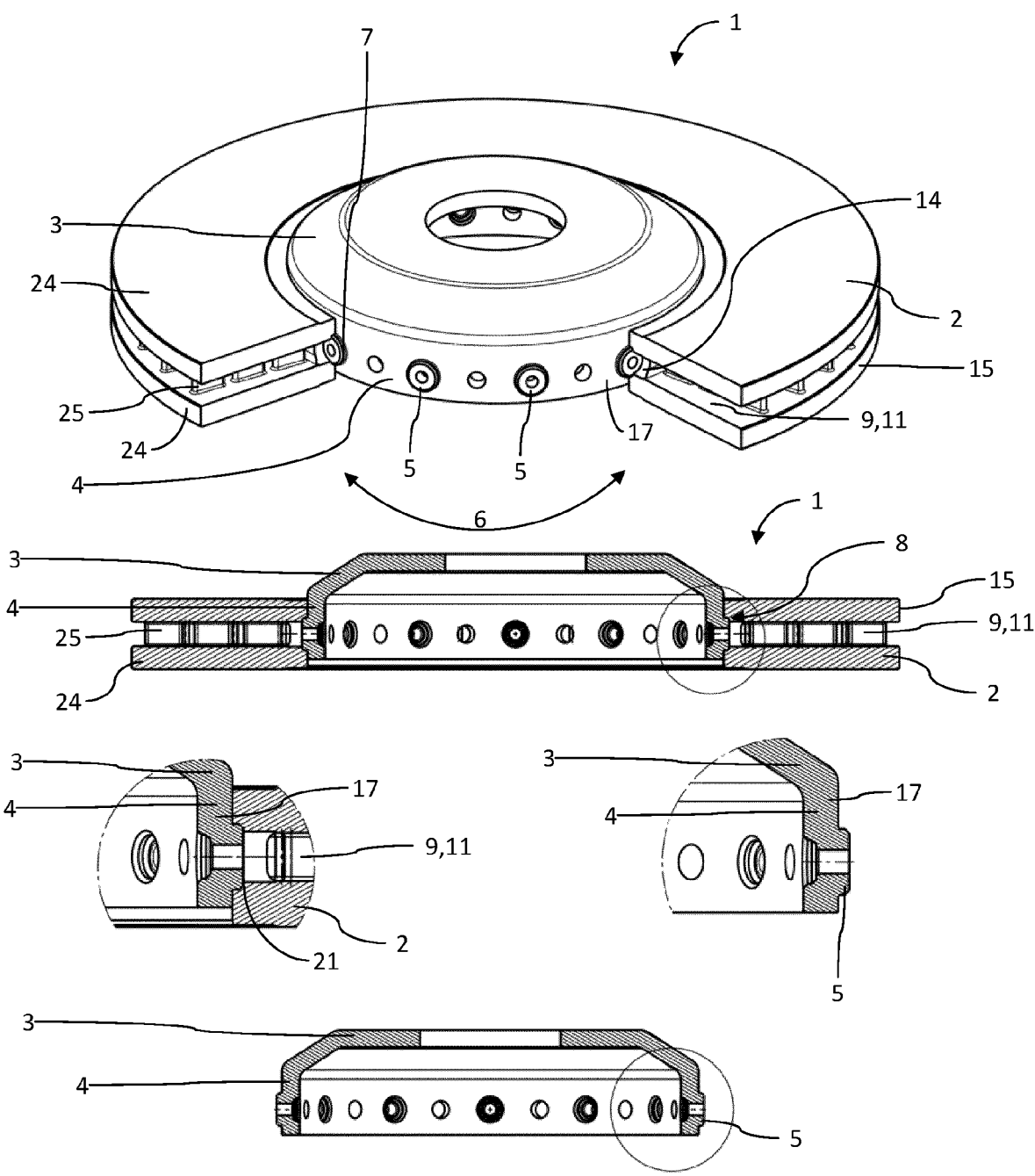
FIG. 12 is a perspective view of a tenth construction variant of a brake disc according to the invention as several sectioned illustrations, wherein all the deformations and securing holes are located in the same plane, wherein the ventilation channels in the friction ring act as securing holes, and wherein the abutment faces are formed by a plurality of deformations which are formed in each case as stampings and which each have a through-opening.

As shown in FIGS. 11 and 12, the deformations 5 may in each case be configured at least partially by stampings 22. Such deformations 5 may be configured with or without a through-opening 20. This embodiment is particularly suitable for brake hubs 3 of aluminum. Stamping methods have the advantage that larger sheet thicknesses can also be processed therewith without resulting in the formation of cracks or excessive material accumulations, in particular at bending locations in the side wall portion 17.

In principle, embodiments of a brake hub 3 with through-openings 20 have the possibility of achieving better inner ventilation of the brake disc 1 as a result of better heat discharge.

The through-openings 20 may, for example, be associated with the inlet opening 14 of the ventilation channels 11 of the friction ring 2. This is particularly simple when all the through-openings 20 and inlet openings 14 are arranged in the same plane.

The plane may in this instance relate to a plane which is defined by the friction ring 2. Preferably, the friction ring 2 may be a friction ring 2 which has an upper side and a lower side and which is preferably formed by two friction discs 24 which are connected to each other by means of webs 25.

The individual ventilation channels 11 and/or the securing holes 9 may be delimited by means of a plurality of webs 25.

The webs 25 may consequently extend in an axial direction between two friction discs 24.

There may be provision for the brake disc 1 to have a plurality of webs 25 which are arranged one behind the other, in particular in a row or line, and/or which are separated from each other by means of a free space.

Figure 3:
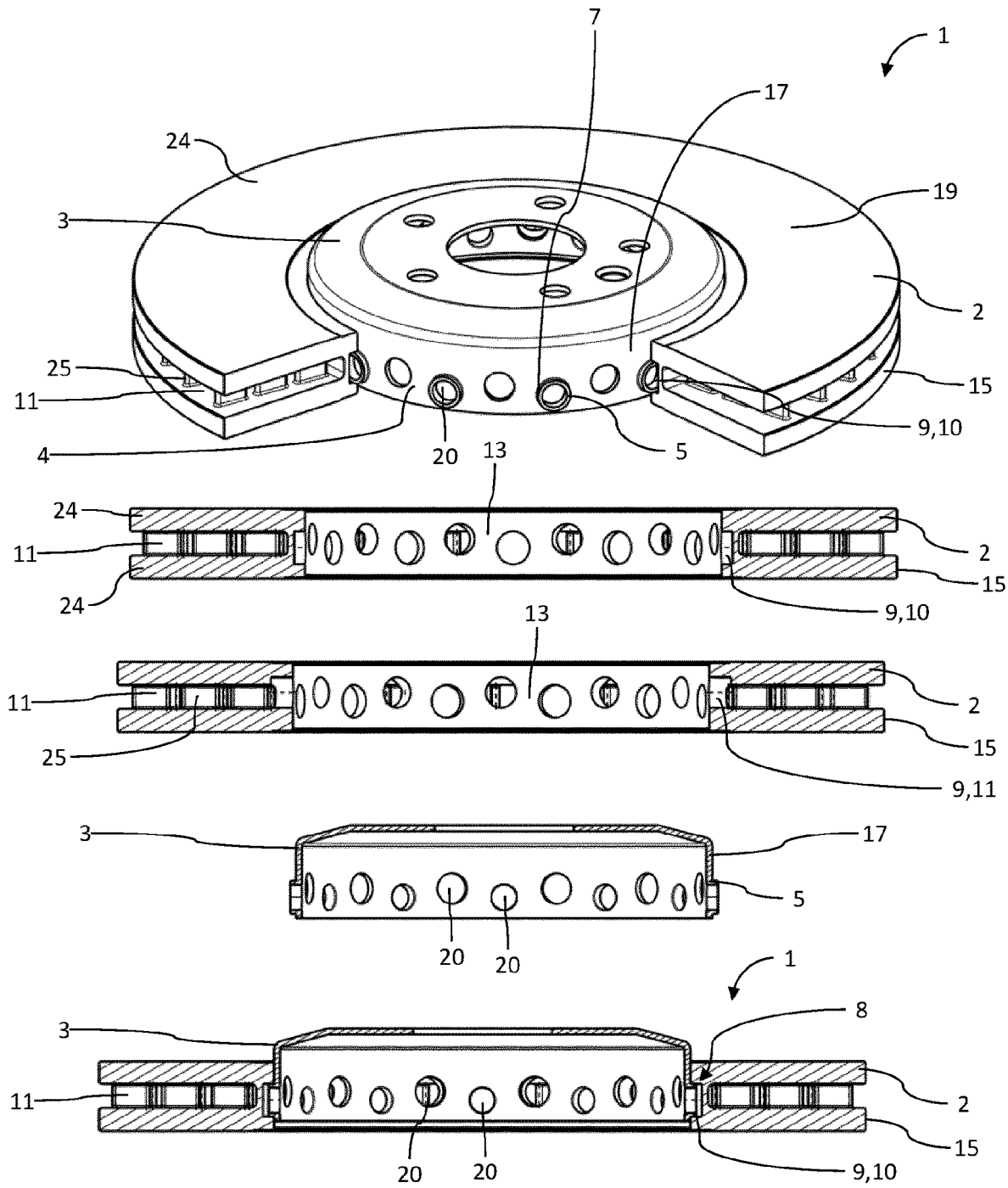
FIG. 3 is a perspective illustration of a second construction variant of a brake disc according to the invention as several sectioned illustrations, wherein the individual through-openings are located in different planes so that only the through-openings which have a deformation are located in a plane with the securing holes, and wherein ventilation channels and/or blind holes in the friction ring act as securing holes.

The through-openings 20 and/or the deformations 5 may, however, also be arranged in different planes, as shown, for example, in FIG. 3. In this instance, the through-openings 20 may partially fulfil different purposes. The through-opening 20 associated with the ventilation channels 11 may be used for better internal ventilation. The through-openings 20 and/or deformations 5 which are arranged in a plane deviating from this may in particular be provided exclusively to form the rotationally secure connection between the friction ring 2 and the brake hub 3 or to perform a dual function.

An edge region of the through-openings 20 may, for example, be constructed in each case as the above-mentioned deformations 5. The deformations 5 may in this instance, for example, be configured as necks which are preferably constructed in each case as circumferential collars around the through-opening 20.

The deformations 5 of the brake discs 1 may be arranged in a state distributed in a uniform manner, in particular distributed in a point-symmetrical manner, in a plane or in several planes.

The deformations 5 may also be arranged in a non-uniform manner, in particular with different angular spacings with respect to each other in a plane or in several planes.

The brake hub 3 may have deformation-free through-openings 20. As previously already explained, the through-openings with and without deformations 5 may perform different functions. Through-openings 20 without deformations 5 may, for example, be provided for ventilation. Through-openings 20 with deformations 5 may, for example, be provided for ventilation and/or in order to form the positive-locking connection 8.

A geometry of the securing holes 9 may in each case be made available by means of a casting method in a cast, wherein additional reprocessing steps, such as a machining processing operation, are not required.

The deformations 5 may have a uniform shape so that, in the event of a load, a uniform stress path can be achieved.

At least one securing hole 9 may have a stop 21 which may be constructed, for example, as a step. The at least one deformation 5 which engages in the securing hole 9 may act on the stop 21.

A number of deformations 5 may in each case be smaller than a number of possible securing holes 9.

A number of securing elements 12 may also be smaller than a number of possible securing holes 9.

As a result of changing the number of deformations 5 and/or the securing elements 12, it is possible to be able to adjust a brake torque of the brake disc 1.

As shown in FIGS. 1 to 12, the deformations 5 may be arranged with regular angular spacings with respect to each other. A particularly uniform load distribution is thereby possible during a braking operation.

The invention thus relates in particular to a preferably internally ventilated brake disc 1 which comprises at least one friction ring 2 and a brake hub 3 which is connected to the friction ring 2 in a rotationally secure manner, wherein a side wall portion 17 of the brake hub 3 has a plurality of radially orientated deformations 5, via which deformations 5 an abutment face 7 which extends in a radial direction is formed, by means of which abutment face 7 a rotationally secure connection 8 between the friction ring 2 and the brake hub 3 is produced, and wherein a ratio Da/Di formed from the outer diameter Da of a side wall portion 17 of the brake hub 3 and an inner diameter Di of the friction ring 2 is a maximum of 1.01.

LIST OF REFERENCE NUMERALS

1 Brake disc
2 Friction ring
3 Brake hub
4 Side wall
5 Deformation
6 Circumferential direction
7 Abutment face
8 Rotationally secure connection
9 Securing hole
10 Blind hole
11 Ventilation channel
12 Securing element
13 Inner circumferential face
14 Inlet opening
15 Outer circumferential face
16 Stamp
17 Side wall portion
18 Gap
19 Friction face
20 Through-opening
21 Stop
22 Stamping
23 Curvature
24 Friction disc
25 Web

The invention claimed is:

1. A brake disc (1), comprising:
at least one friction ring, (2)
a brake hub (3) connected to the friction ring (2) in a rotationally secure manner, a side wall (4) of the brake hub (3) has at least one deformation (5) in a radial direction, said at least one deformation (5) forming an abutment face (7) which is orientated in a circumferential direction (6) of the brake hub (3), said abutment face (7) providing a rotationally secure connection (8) between the friction ring (2) and the brake hub (3), a ratio Da/Di formed from an outer diameter Da of the brake hub (3) and an inner diameter Di of the friction ring (2) is a maximum of 1.01, and the outer diameter Da of the brake hub (3) is constructed to be larger than the inner diameter Di of the friction ring (2), and wherein the brake hub (3) has at least one through-opening (20) having one said deformation (5) and at least one through-opening (20) without any deformation (5).

2. The brake disc (1) as claimed in claim 1, wherein the friction ring (2) has at least one securing hole (9) configured as at least one of a blind hole (10) or a ventilation channel (11).

3. The brake disc as claimed in claim 2, wherein the abutment face comprises a securing element (12), and at least one of the at least one deformation (5) or the securing element (12) which is inserted into and/or retained by the at least one deformation (5) at least partially engages in the at least one securing hole (9).

4. The brake disc (1) as claimed in claim 1, wherein the friction ring (2) has at least one ventilation channel (11) which at least partially extends in a radial direction.

5. The brake disc as claimed in claim 4, wherein the ventilation channel (11) extends from an inlet opening (14) formed in an inner circumferential face (13) as far as an outer circumferential face (15) of the friction ring (2).

6. The brake disc (1) as claimed in claim 1, wherein at least one securing element (12) is inserted into the at least one deformation (5).

7. The brake disc (1) as claimed in claim 6, wherein the at least one securing element (12) is configured as a hollow pin.

8. The brake disc (1) as claimed in claim 6, wherein the friction ring (2) has at least one securing hole (9), and a number of the securing elements (12) is smaller than a number of the securing holes (9).

9. The brake disc (1) as claimed in claim 1, wherein the at least one through-opening (20) is associated with at least one inlet opening (14) of a ventilation channel (11) of the friction ring (2).

10. The brake disc (1) as claimed in claim 9, wherein an edge region of the at least one through-opening (20) is formed as the at least one deformation (5).

11. The brake disc (1) as claimed in claim 10, wherein at least one of the at least one deformation (5) or the at least one through-opening (20) of the brake hub (3) is arranged so as to correspond to a position of the at least one inlet opening (14) of the ventilation channel (11) on the friction ring (2).

12. The brake disc (1) as claimed in claim 1, wherein the deformation (5) is directed outward.

13. The brake disc (1) as claimed in claim 1, wherein at least one securing element (12) is retained by the deformation (5), and the abutment face (7) is formed at least partially by the securing element (12).

14. The brake disc (1) as claimed in claim 1, wherein at least one of: (a) the ratio Da/Di which is formed by the outer diameter Da of the brake hub (3) and the inner diameter Di of the friction ring (2) is a minimum of 0.99, or (b) a gap (18) is formed between a side wall portion (17) of the brake hub (3) and an inner circumferential face (13) of the friction ring (2).

15. The brake disc (1) as claimed in claim 1, wherein the inner diameter of the friction ring (2) is determined by an inner delimitation of a friction face (19) on which a braking operation is carried out.

16. The brake disc as claimed in claim 1, wherein the at least one deformation (5) is formed by at least one of punching, bending, or a stamping (22) of a wall of the brake hub (3) when the brake hub (3) is arranged in the friction ring (2).

17. A brake disc (1), comprising:
at least one friction ring, (2)
a brake hub (3) connected to the friction ring (2) in a rotationally secure manner, a side wall (4) of the brake hub (3) has at least one deformation (5) in a radial direction, said at least one deformation (5) forming an abutment face (7) which is orientated in a circumferential direction (6) of the brake hub (3), said abutment face (7) providing a rotationally secure connection (8) between the friction ring (2) and the brake hub (3),
a ratio Da/Di formed from an outer diameter Da of the brake hub (3) and an inner diameter Di of the friction ring (2) is a maximum of 1.01, and the outer diameter Da of the brake hub (3) is constructed to be larger than the inner diameter Di of the friction ring (2), and
the deformation (5) is directed inward.

18. A brake disc (1), comprising:
at least one friction ring, (2)
a brake hub (3) connected to the friction ring (2) in a rotationally secure manner, a side wall (4) of the brake hub (3) has at least one deformation (5) in a radial direction, said at least one deformation (5) forming an abutment face (7) which is orientated in a circumferential direction (6) of the brake hub (3), said abutment face (7) providing a rotationally secure connection (8) between the friction ring (2) and the brake hub (3),
a ratio Da/Di formed from an outer diameter Da of the brake hub (3) and an inner diameter Di of the friction ring (2) is a maximum of 1.01, and the outer diameter Da of the brake hub (3) is constructed to be larger than the inner diameter Di of the friction ring (2), and
the friction ring (2) has at least one securing hole (9), and a number of the deformations (5) is smaller than a number of the securing holes (9).

* * * * *